United States Patent [19]
Pompei et al.

[11] Patent Number: 5,893,833
[45] Date of Patent: Apr. 13, 1999

[54] AXILLARY INFRARED THERMOMETER AND COVER THEREFOR

[75] Inventors: Francesco Pompei; Marybeth A. Pompei, both of Boston, Mass.

[73] Assignee: Exergen Corporation, Watertown, Mass.

[21] Appl. No.: 08/469,484

[22] Filed: Jun. 6, 1995

[51] Int. Cl.$^6$ ........................................ A61B 5/00
[52] U.S. Cl. .............................. 600/549; 206/212
[58] Field of Search ........................... 128/736, 664; 206/212, 570, 571, 305, 306

[56] References Cited

U.S. PATENT DOCUMENTS

| | | | |
|---|---|---|---|
| D. 303,008 | 8/1989 | O'Hara et al. | D24/18 |
| 3,215,265 | 11/1965 | Welin-Berger | 206/212 |
| 3,878,836 | 4/1975 | Twentier | 128/9 |
| 3,949,740 | 4/1976 | Twentier | 128/9 |
| 4,054,057 | 10/1977 | Kluge | 73/343 R |
| 4,159,766 | 7/1979 | Kluge | 206/306 |
| 4,602,642 | 7/1986 | O'Hara et al. | 128/664 |
| 4,614,442 | 9/1986 | Poncy | 374/158 |
| 4,662,360 | 5/1987 | O'Hara et al. | 128/9 |
| 4,784,149 | 11/1988 | Berman et al. | 128/664 |
| 4,790,324 | 12/1988 | O'Hara et al. | 128/664 |
| 4,854,730 | 8/1989 | Fraden | 374/164 |
| 4,863,281 | 9/1989 | Suszynski | 374/158 |
| 4,911,559 | 3/1990 | Meyst et al. | 374/158 |
| 4,932,789 | 6/1990 | Egawa et al. | 374/126 |
| 4,993,419 | 2/1991 | Pompei et al. | 128/664 |
| 4,993,424 | 2/1991 | Suszynski et al. | 128/736 |
| 5,018,872 | 5/1991 | Suszynski et al. | 374/133 |
| 5,179,936 | 1/1993 | O'Hara et al. | 128/9 |

*Primary Examiner*—Max Hindenburg
*Assistant Examiner*—Pamela Wingood
*Attorney, Agent, or Firm*—Hamilton, Brook, Smith & Reynolds, P.C.

[57] ABSTRACT

An infrared detector has a probe having curved surfaces which slide readily into a neonate axilla. The probe is covered by a disposable cover, or a bag completely encloses the infrared detector. The bag has a pleated end surface, through which the detector views the skin, and a flap at a rear surface to close an opening which receives the detector.

6 Claims, 11 Drawing Sheets

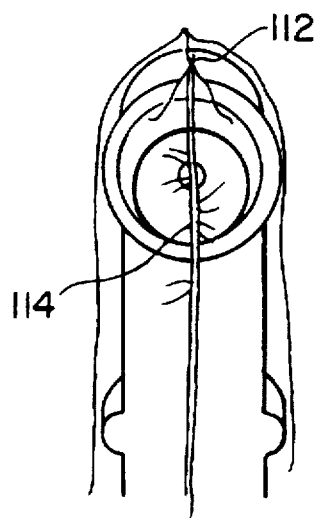
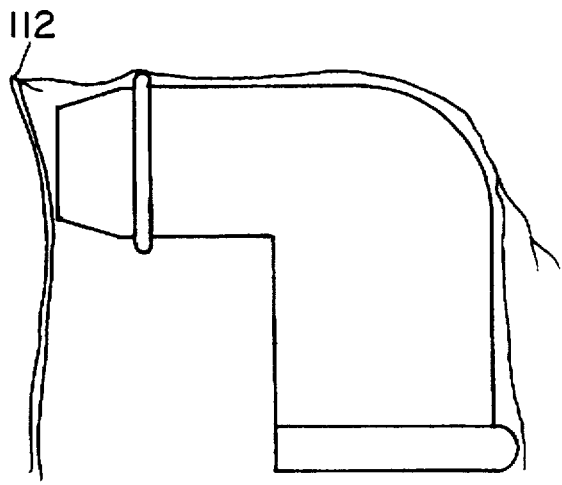
FIG. 21A  FIG. 21B
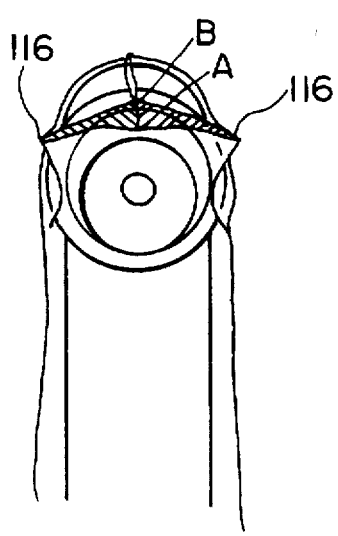
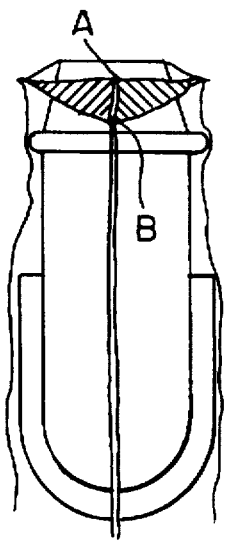
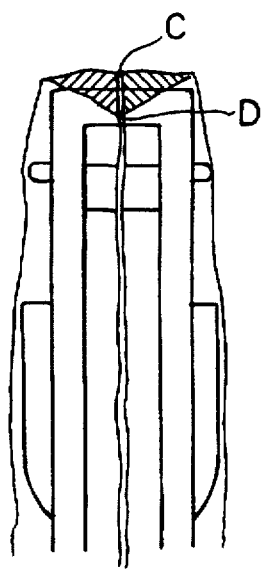
FIG. 22A  FIG. 22B  FIG. 22C

AXILLARY INFRARED THERMOMETER AND COVER THEREFOR

BACKGROUND

Neonates are incapable of maintaining their own body temperature during the first few weeks of life. Skin perfusion rates are very high and the infant loses heat rapidly. Thermal management is critical, requiring an accurate, fast, noninvasive method of core temperature measurement.

Rectal temperature has long been considered to be the standard indicator of neonate core temperature. However, since temperature measurements from different locations on a neonate's skin are sufficiently uniform as to be relatively interchangeable with one another, the clinician may select the most noninvasive and convenient site at which to measure temperature. Due to its inherent safety and long established efficacy, axilla is the most recommended site for neonates. Unfortunately, conventional thermometers such as glass/mercury, electronic and paper strip thermometers require up to several minutes to obtain an accurate axillary reading.

In recent years, infrared thermometers have come into wide use for detection of temperature of adults. For core temperature readings, infrared thermometers which are adapted to be inserted into the patient's ear have been extremely successful.

Infrared thermometry has not found such high acceptance for use with neonates. Neonates have a very high moisture level in their ear canals, due to the presence of vernix and residual amniotic fluid, resulting in low tympanic temperatures because of the associative evaporative cooling. In addition, environmental uncertainties, such as radiant heaters and warming pads can significantly influence the air temperatures. Further, clinicians are less inclined to position the tip of an infrared thermometer in the ear of a small neonate.

SUMMARY OF THE INVENTION

The present invention relates to an infrared thermometer which is designed for axillary temperature measurements. An infrared detector probe is designed to easily slide into the axilla to lightly touch the apex of the axilla. Because it relies on infrared temperature detection, a temperature reading can be obtained in as little as one-half second. A novel cover is also provided to provide for ease of use in a sterile environment.

In accordance with the present invention, a person's temperature is obtained using an infrared detector having a window through which a sensor views a surface target. A sheet is stretched at least over a portion of the infrared detector, and a tip of the detector is pressed against the person's skin, with the sheet therebetween, to detect heat flux from the skin. Preferably, the window through which the sensor views a surface target is at the base of a reflective cup.

In a preferred embodiment of the invention, the sheet is a bag which fully covers the infrared detector. The preferred bag is rectangular and open along an edge thereof. A flap at the open edge may be folded over the opening to close the bag about the detector. The bag has a pleat, along an edge opposite to the open edge, which expands to provide depth to the bag. The bag membrane is less than 1.25 milli-inch thick and preferably less than 1.0 milli-inch. The bag is preferably about 4 inches by 7½ inches with a pleat at least ½ inch deep, preferably about ¾ inch.

It is preferred that the sheet which covers the detector is infrared transparent. However, the sheet may be opaque if it is able to quickly equalize in temperature with the target temperature. Thermal equalization is obtained quickly with a thin membrane. Thus, though thicker membranes may be used, it is preferred that the plastic membrane be less than 1.25 milli-inch to allow for prompt temperature equalization. That temperature equalization is even important with a transparent membrane since the detector may still see heat flux from the membrane. With a transparent membrane, it is important that the membrane be kept thin in order to absorb as little infrared radiation as possible passing from the target to the detector and to assure prompt temperature equalization of the membrane with the target.

The preferred detector comprises a main body to be held by hand and a sensor probe. The probe has a first portion extending from an end surface of the main body and a second portion extending from the first portion substantially parallel to the end surface. The top of the second portion and the outer corner where the first and second portions join are rounded. The second portion of the probe has a frustoconical tip which ends at a cup in which the window is positioned. A peripheral bead surrounds the probe behind the frustoconical tip to stretch the transparent bag across the end of the tip. A nub extends from an end surface of the main body opposite to the sensor probe, the nub stretching and retaining the transparent bag.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 21A and 21B are front and side views of the detector probe with a bag cover which is not pleated.

FIGS. 22A, 22B and 22C are respective front, top and bottom views of the probe with a bag having a pleat with a less than optimal depth.

DETAILED DESCRIPTION OF PREFERRED EMBODIMENTS

Figure 1:
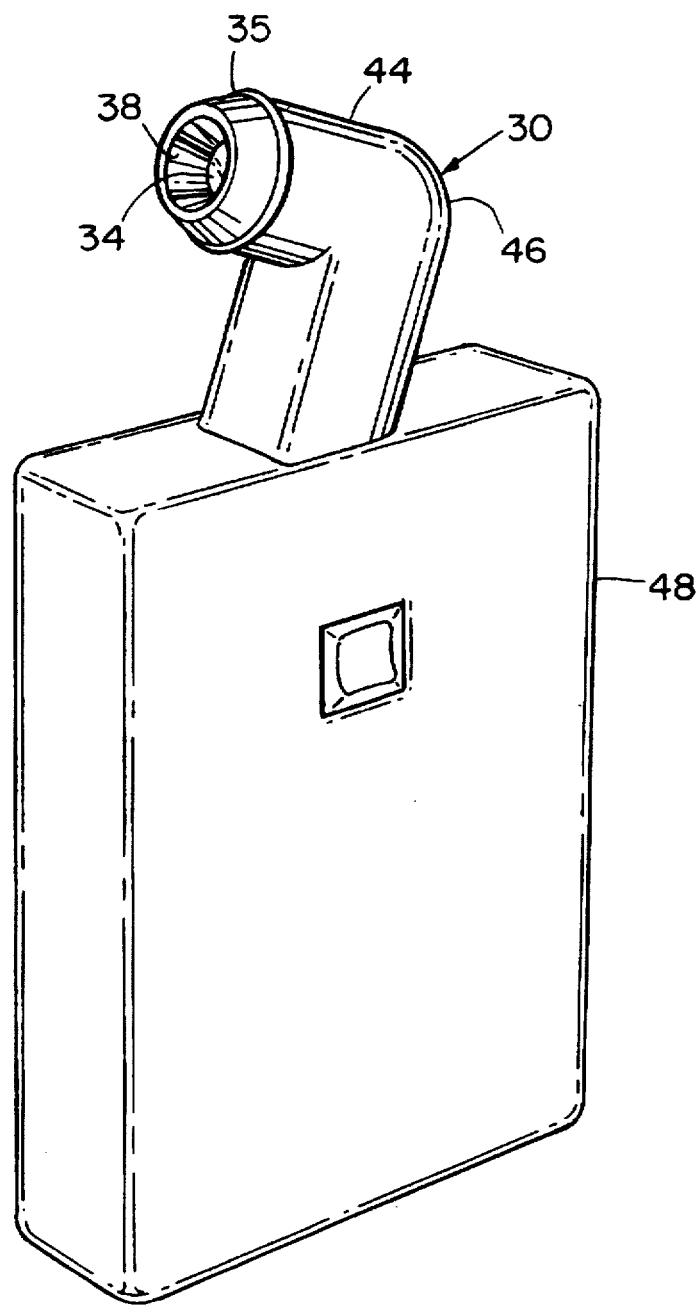
FIG. 1 illustrates one embodiment of a detector suited for axillary temperature detection.

The preferred embodiments of the present invention illustrated in FIGS. 1–6 are based on infrared temperature detection technology previously presented in U.S. Pat. Nos. 4,636,091; 4,993,419; 5,199,436; 5,271,407 and 5,325,863, all assigned to Exergen Corporation. As in those prior patents, an infrared sensor is positioned in a probe 30 or 32 to view a target surface through a rigid window 34 or 36 at the tip of the probe. Four of the patents disclose infrared thermometers designed specifically for use as ear temperature detectors. Structural modifications of the probe for axillary temperature measurements include the shape of the probe and the positioning of the windows 34 and 36 at the bases of reflective cups 38 and 40. As described in U.S. Pat. No. 4,636,091, the reflective cups are preferably conical. By positioning the rim 35, 37 of a reflective cup against a surface, the target surface is viewed by the infrared sensor as a black body, so the cup provides emissivity compensation.

Figure 2:
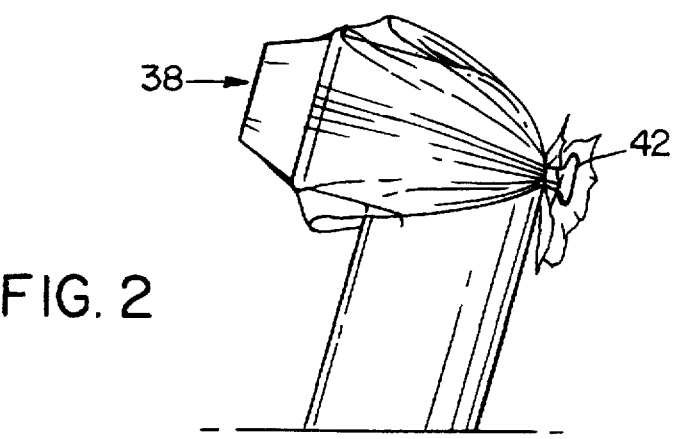
FIG. 2 is a side view of the probe of the detector of FIG. 1 having a disposable cover positioned thereon.
Figure 3:
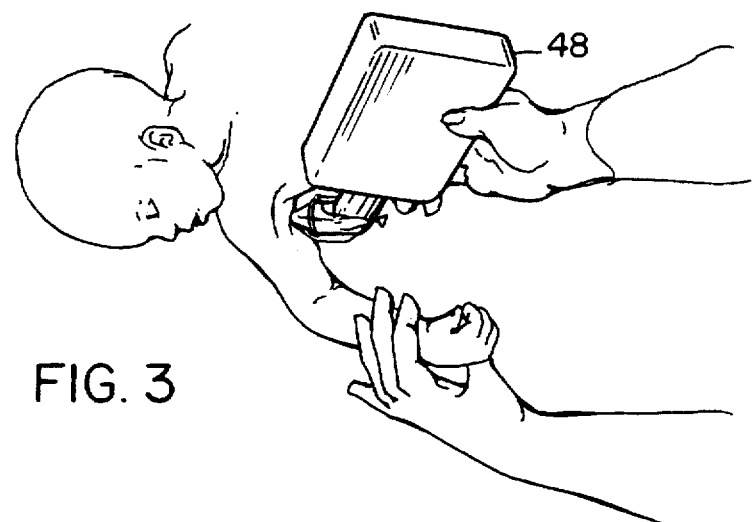
FIG. 3 illustrates use of the infrared thermometer of FIG. 1 with the cover of FIG. 2.

The embodiment of FIGS. 1–3 relies on a disposable probe cover previously presented in U.S. Pat. No. 4,993,419. The cover is a flat sheet having holes at opposite ends thereof. To position the cover over the probe, one hole is positioned over a knob 42, the sheet is stretched over the cup 38 at the tip of the probe and the other hole is then passed over the knob 42 to firmly retain the sheet over the probe. Thus stretched over the probe, the sheet follows the cylindrical surface of the end of the probe. The large curved surfaces, both around the end portion 44 of the probe and at its intersection with the base portion at the corner 46, enable the probe to be easily slid into the axilla.

Figure 4:
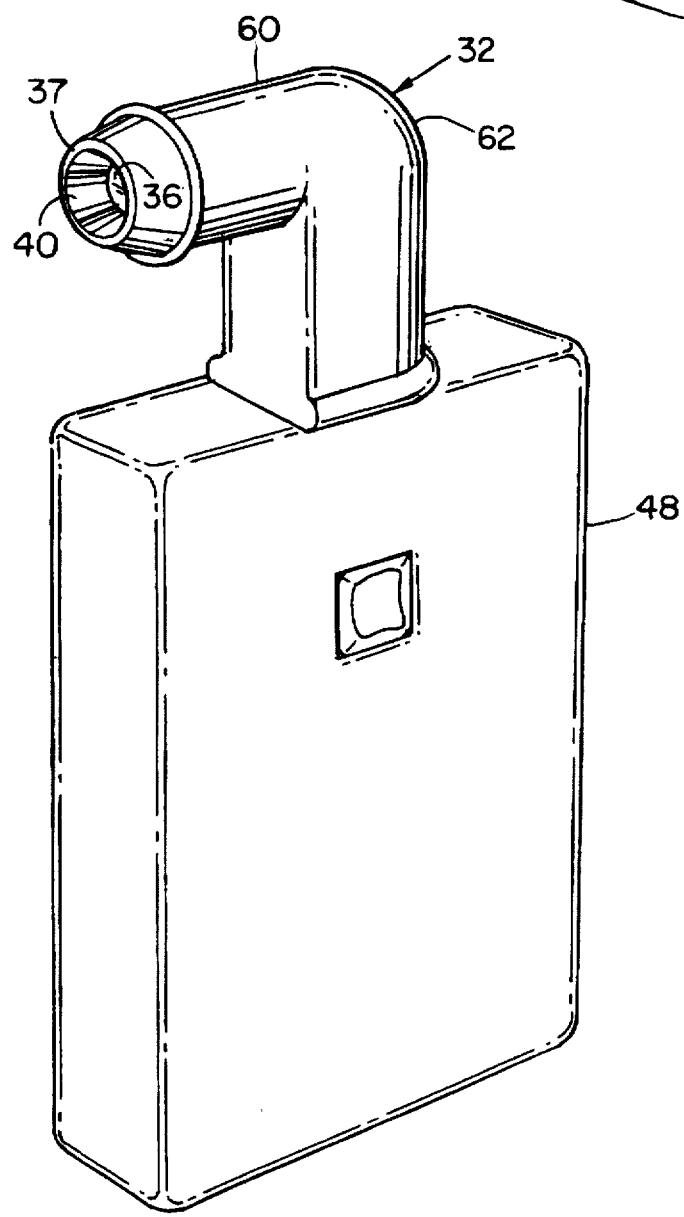
FIG. 4 illustrates an alternative embodiment of the infrared detector.
Figure 5:
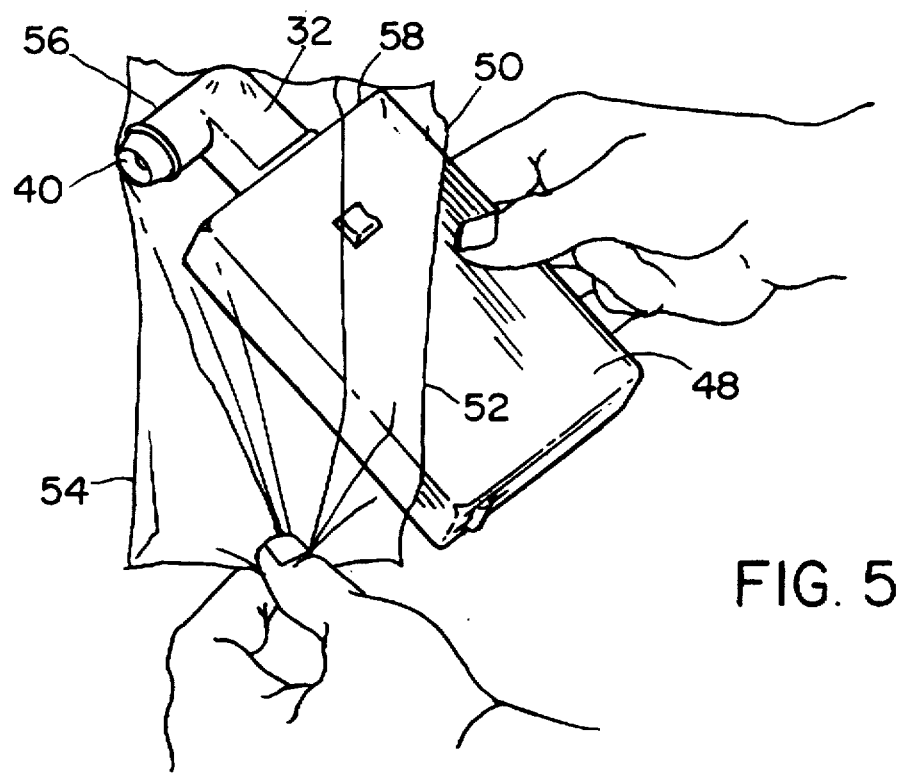
FIG. 5 illustrates positioning of the detector of FIG. 4 in a disposable bag cover.
Figure 6:
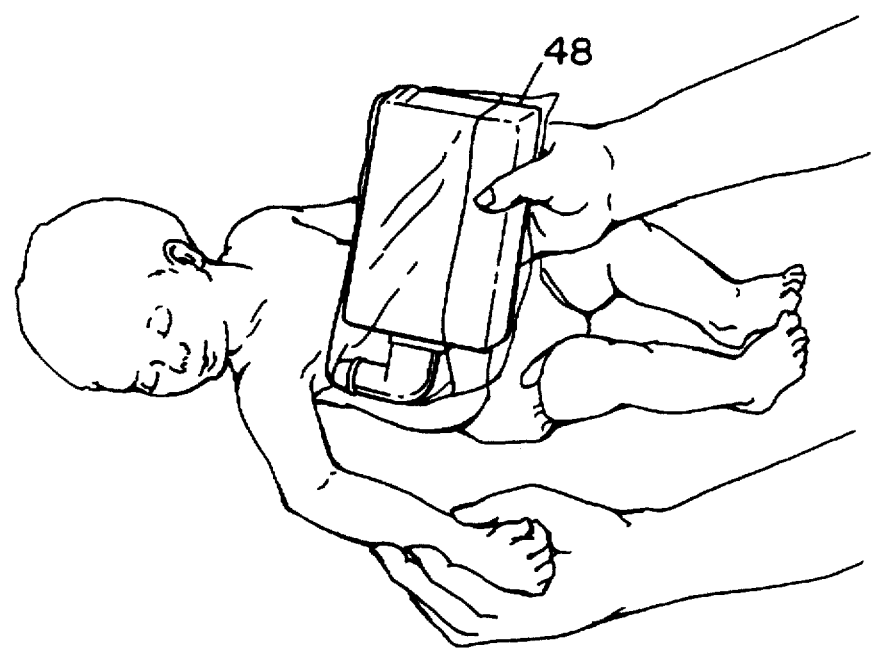
FIG. 6 illustrates use of the infrared thermometer of FIG. 5 in obtaining an axillary temperature measurement.

For improved cleanliness of the detector in the neonatology environment, the embodiment of FIGS. 4 through 6 is provided. In this embodiment, the entire detector, including the main housing 48 and the probe 32, is inserted into a transparent bag 50 through a rear opening 52. As described in detail below, the bag has a pleated front edge 54 and a flap for covering the opening 52. In order to assure that the plastic bag stretches flat over the cup 40, the probe 32 is positioned such that the front portion 56 of the probe extends generally parallel to the end surface 58 of the main body of the detector. There is a curved surface across the top of the end portion 60 of the probe 32 and a rounded corner 62 to assure that the probe can be slid easily into the axilla for use as illustrated in FIG. 6.

Figure 7:
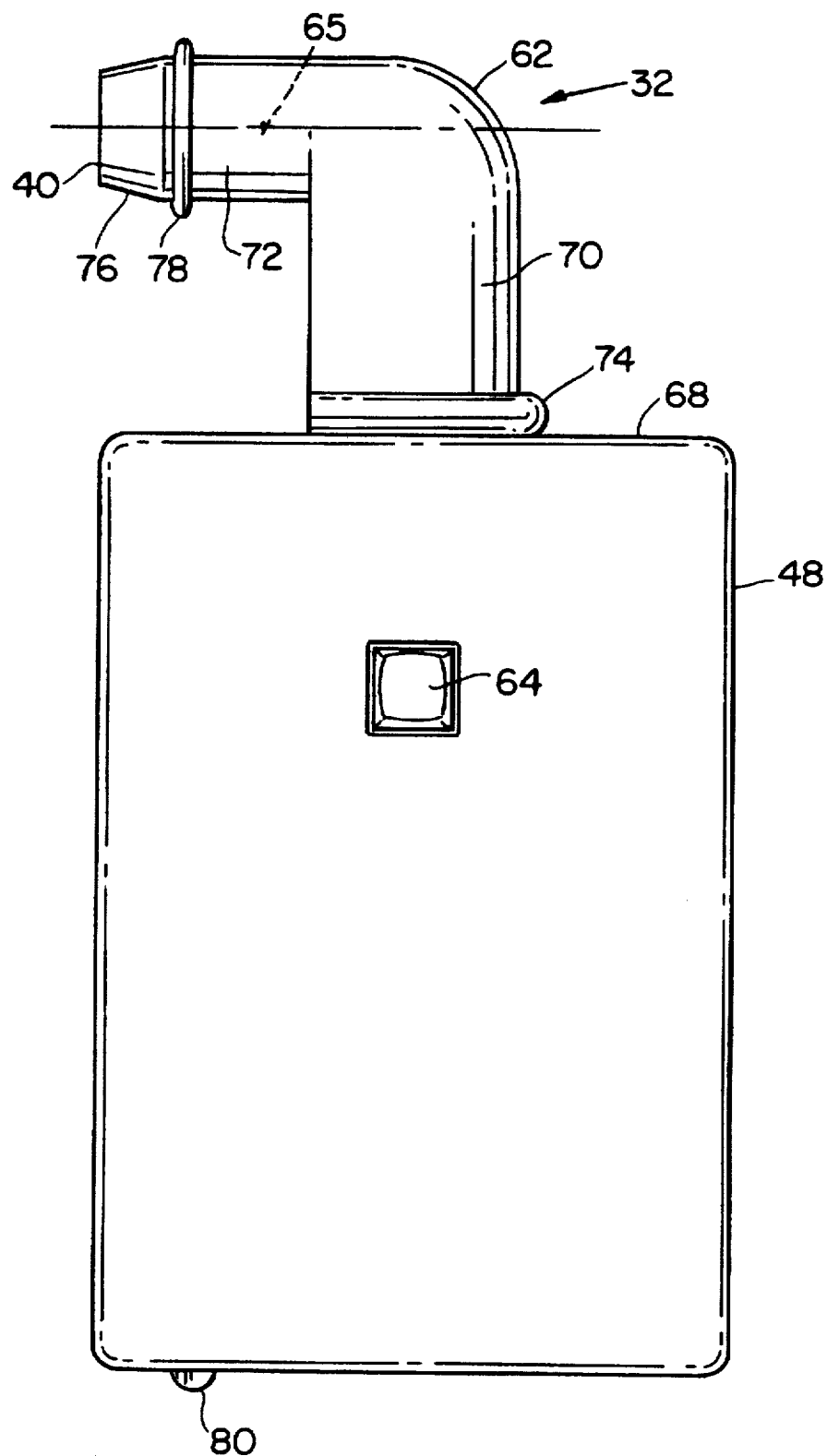
FIG. 7 is a side view of the infrared detector of FIG. 4.
Figure 8:
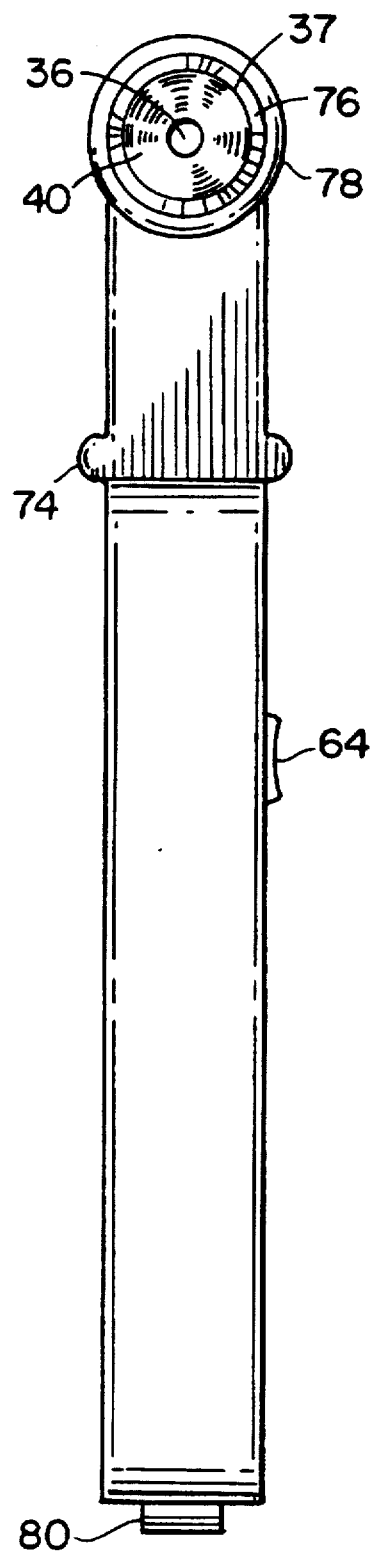
FIG. 8 is a front view of the detector of FIG. 7.
Figure 9:
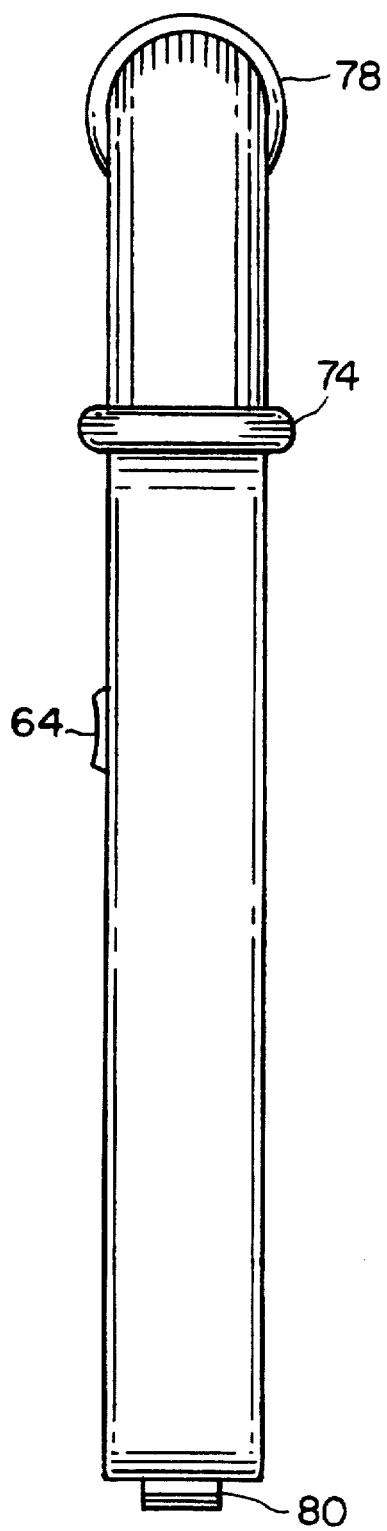
FIG. 9 is a rear view of the detector of FIG. 7.
Figure 11:
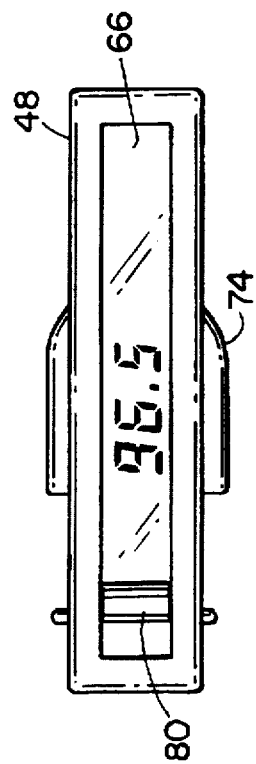
FIG. 11 is a bottom view of the detector of FIG. 7.

A side view of the detector embodiment of FIG. 4 is presented in FIG. 7. The main body 48 of the detector housing has a button 64 to trigger a temperature reading. Using the technology presented in the above noted patents, the heat flux sensed by a sensor 65 is converted to a temperature readout on the display 66 at the bottom of the detector housing 48 (FIG. 11). That readout is obtained within approximately ½ second.

A base portion 70 of the probe 32 extends normally from the top surface 68 of the main housing 48 and then bends into a second portion 72 which extends substantially parallel to the end surface 68. A ridge 74 wraps about the base of the probe 32. The ridge 74 serves the function of preventing the button 64 from being activated when the instrument is placed on a flat surface such as a counter top. It has a curved radius to avoid any sharp edges against the sensitive skin of the neonate. The tip of the probe at 76 extending to the cup 40 is frustoconical, and a bead 78, having a soft radius, encircles the probe just behind the frustoconical tip. A nub 80 protrudes from the bottom surface of the main housing 48 to facilitate positioning and retention of the disposable cover as will be described below.

The use of the emissivity compensation cup facilitates accurate temperature readings regardless of skin color and texture. Additionally, the transparent plastic membrane stretched across the cup eliminates a problem presented by moist skin, that is, that evaporating moisture lowers the surface temperature of the underlying skin and presents a layer of cool vapor. By viewing the skin through the transparent membrane pressed against the skin, evaporation is stopped, and the cool vapor layer is eliminated. Instead, a thin layer of liquid pressed between the transparent membrane and the skin equilibrates to the skin temperature.

Figure 10:
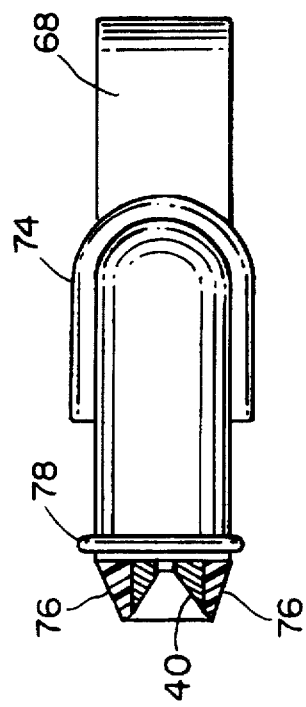
FIG. 10 is a top view of the detector of FIG. 7 with the tip of the probe shown in longitudinal section.

As illustrated in FIG. 10, where the tip of the probe is shown in longitudinal section, the metal cup 40 is surrounded by plastic material 76 which extends slightly beyond the metal of the cup. As such, the potentially cool surface of the metal does not touch the neonate's skin. This not only prevents discomfort to the neonate but also minimizes cooling of the skin which might result in a reduced temperature reading. The field of view of the sensor is sufficiently narrow that it does not view either the cup or the surrounding plastic rim of the tip 76.

The disposable bag cover is illustrated in detail in FIGS. 12 through 15. The bag is preferably formed of polyethylene membrane and is fabricated using conventional bag-forming techniques. However, the bag is dimensioned to meet this particular application and is formed of very thin plastic membrane to minimize absorption of the infrared radiation. The preferred membrane thickness is 0.8 mils. More generally, the thickness should be less than 1.25 mil and more preferably less than 1.0 mil. The thinner membrane also softens the corner folds formed when the bag is stretched over an infrared detector as described below.

For a detector having a height of about 7¼ inches from the bead 78 to the nub 80, and a width of about 3⅛ inches and thickness of about ¾ inch, the bag is 7⅝ inches long and four inches wide. The flap is preferably 1¾ inch wide. Those dimensions provide sufficient stretching of the plastic membrane as the detector is inserted.

Figure 15:
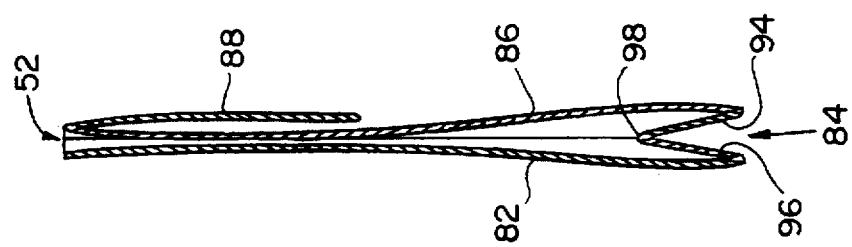
FIG. 15 is a cross-sectional view of the bag of FIGS. 12 and 14 taken along line 15—15 of FIG. 14.

As illustrated in FIG. 15, where the thickness of the membrane is greatly exaggerated, the bag is formed of a single sheet of material which extends along one face 82 folds into a pleat 84, returns along a face 86, and is folded back at a flap 88. The bag is then heat sealed at the top and bottom edges 90 and 92.

Figure 12:
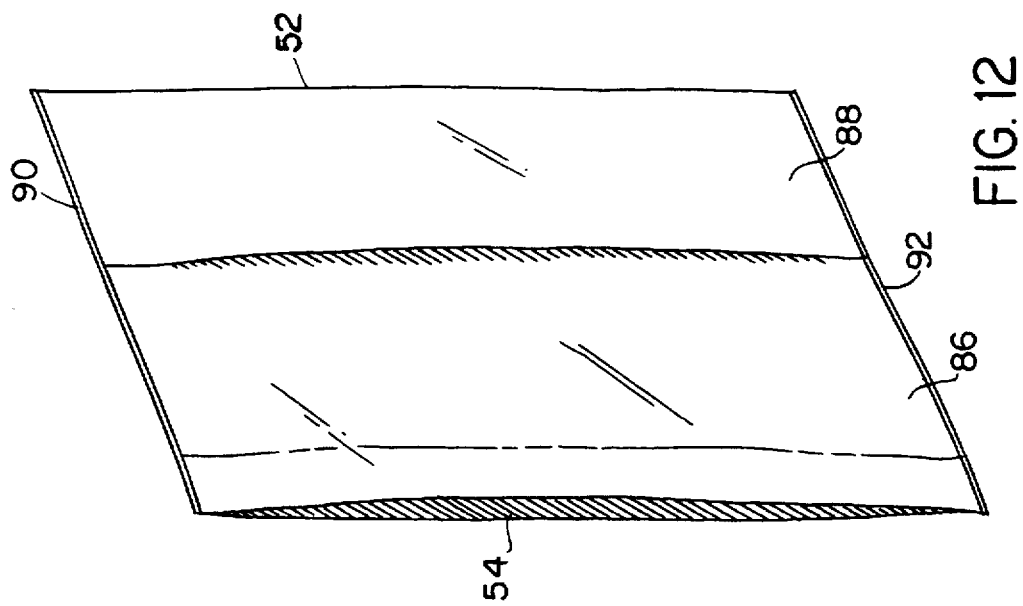
FIG. 12 is a perspective view of a bag cover prior to use.
Figure 13:
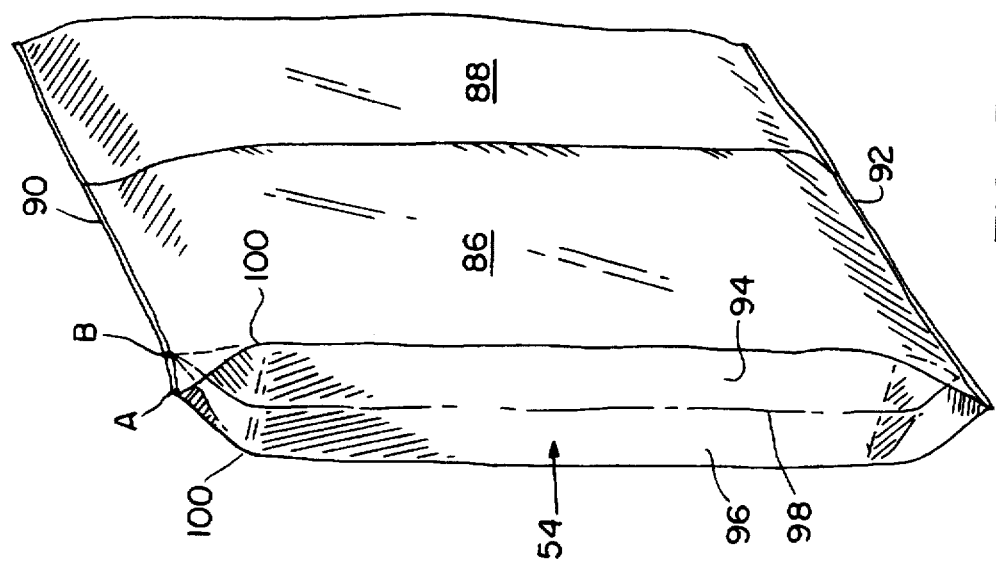
FIG. 13 illustrates the bag of FIG. 12 expanded to illustrate opening of the pleated edge prior to insertion of the infrared detector.
Figure 14:
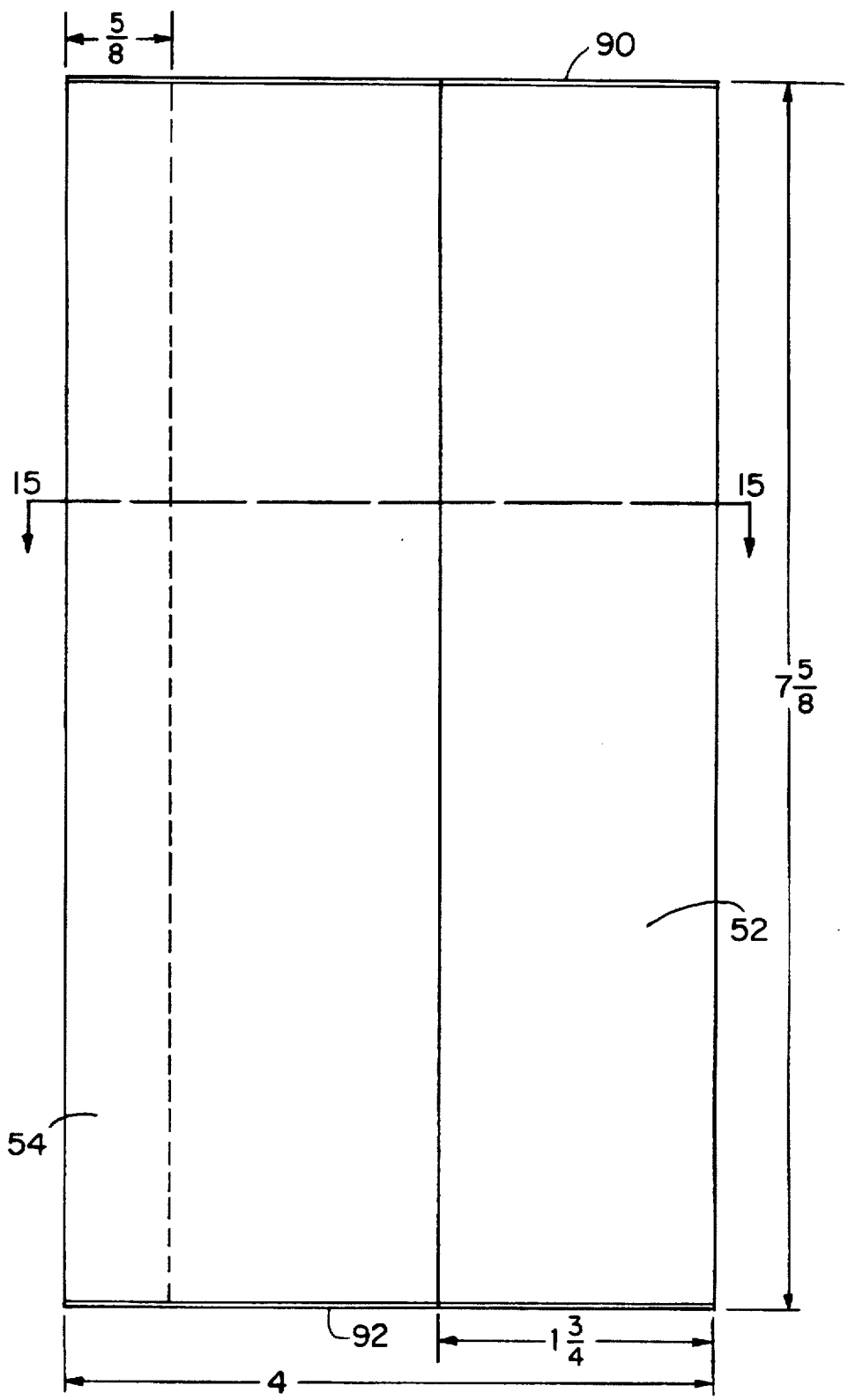
FIG. 14 is a side view of the bag of FIG. 12.
Figure 16:
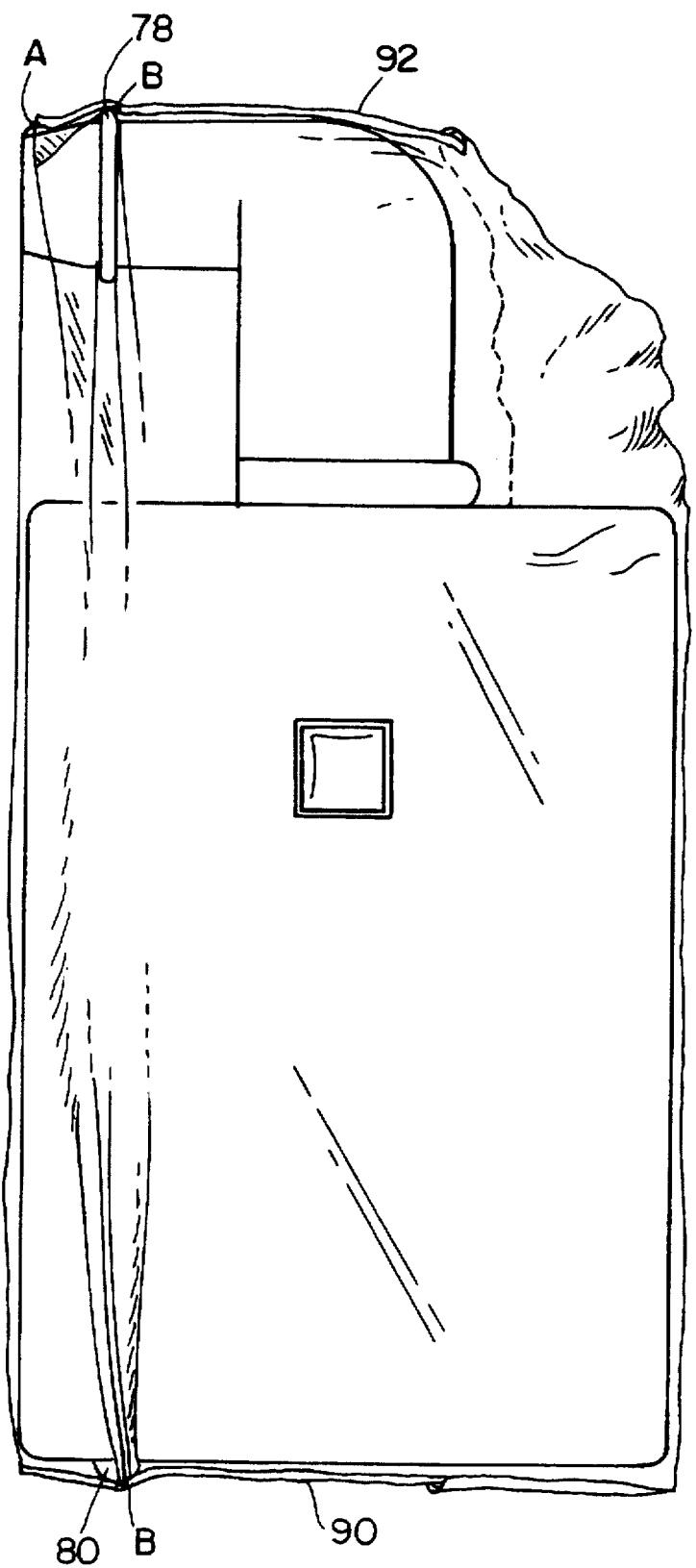
FIG. 16 is a side view of the bag positioned over the infrared detector.
Figure 17:
FIG. 17 is a front view of the bag positioned over the infrared detector as viewed along lines 17—17 in FIG. 16.
Figure 18:
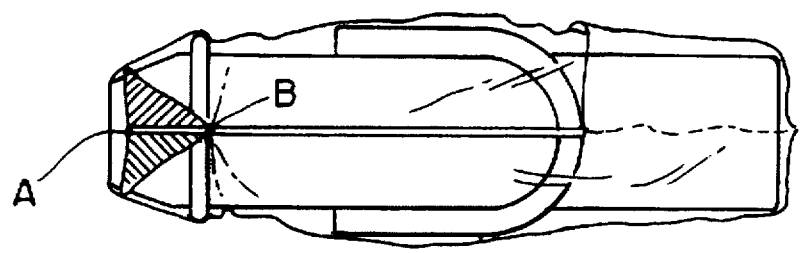
FIG. 18 is a top view of the bag positioned on the infrared detector as in FIG. 16.
Figure 19:
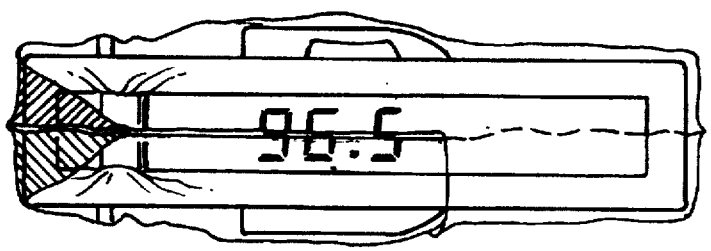
FIG. 19 is a bottom view of the bag positioned on an infrared detector as in FIG. 16.

FIG. 13 illustrates the bag of FIG. 12 with the faces 82 and 86 spread apart to open the pleat 84. The bag is not yet stretched over the detector. The two walls 94 and 96 of the pleat are sealed to each other and to the faces 82 and 86 along the edges 90 and 92. It can be seen in FIG. 13 that the edge 98 of the pleat remains fixed at point B behind the end corner A of the edge even as the main length of the edge 98 moves forward with expansion of the pleat. As a result, as the pleat expands, the upper and lower corners of the bag distort such that the point A pulls up and to the rear and such that ears are formed at 100. The bag is designed in order to minimize the protrusions formed at point A and ears 100 and to assure that they are pulled back away from the cup 40. As such, any potential irritation to the neonate is minimized and a flat clear face of the plastic membrane is stretched over the cup for unobstructed infrared viewing.

To that end, the depth of the pleat along each of the surfaces 94 and 96 is greater than the diameter of the tip of the probe which is preferably about ½ inch. In particular, the preferred pleat depth is about ⅝ inch.

The bag pulled fully over the infrared detector is illustrated in FIGS. 16 through 19. To position the detector in the bag, the probe is first inserted through the rear opening and the curved corner 62 of the probe is appropriately pressed against the mid region of the bag as illustrated in FIG. 5. The housing 48 is then pivoted into the bag, stretching the bag over the nub 80. In the final position illustrated in FIGS. 16 through 19, the points B at the upper and lower edges of the bag are retained behind the bead 78 and nub 80, respectively. As such, the bag is prevented from slipping forward and it is retained stretched over the front of the cup 40. The soft radiuses of the bead 78 and nub 80 also prevent tearing of the bag at the seam as it is stretched over the detector.

Figure 20:
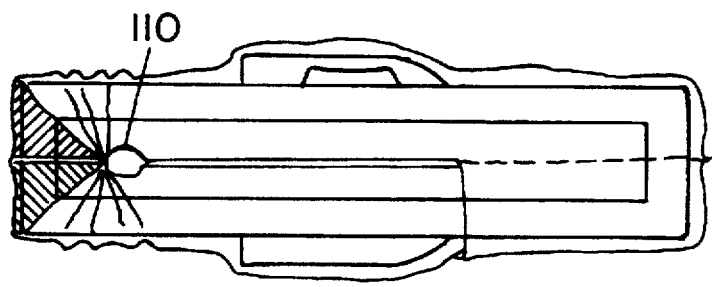
FIG. 20 is a bottom view as illustrated in FIG. 19 but with the lower nub removed to illustrate the possible failure of the bag without the nub.

The nub 80 only extends along a length which is about half the thickness of the detector and is centered in the bottom surface. As the detector is forced into position, stretching the bag, the main stretching force is applied at the rounded corner 62 of the probe and at the nub 80. Without the nub, it was determined that the bag was susceptible to failure along the seam as illustrated in FIG. 20. Without the nub, the bag was necessarily stretched across the outer edges of the bottom surface which tended to pull the seam apart, resulting in a hole at 110.

The importance of the pleat is illustrated by the comparison to FIGS. 21A and 21B. Without the pleat, a sharp corner protrudes in front of the probe and may be a source of irritation to the neonate. Further, the two surfaces 82 and 86 do not stretch readily across the face of the cup and can result in some distortion along the fold line. With the pleat and sufficient stretching of the membrane, the side surfaces 82 and 86 are pulled completely away from the end of the cup and the pleat surfaces 94 and 96 readily form a flat transverse surface across the cup. Further, the potential corners at point A and at the ears 100 pull back snugly against the frustoconical tip.

Proper dimensioning of the pleat is also important as illustrated in FIGS. 22A through 22C. In this illustration, the pleat is of a depth between points A and B which is less than the diameter of the cup 40. As a result, the point B does not reach behind the bead 78 and the bag is inclined to slip forward. Further, the bag tends to form larger ears 116 which can irritate the neonate.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of obtaining a person's temperature comprising:

providing an infrared detector having a window, through which a sensor views a surface target, at the base of a cup, the sensor field of view being such that the sensor does not view the cup;

stretching a plastic sheet over the cup such that the surface target is viewed through the sheet; and positioning the sheet and cup against the person's skin with the sheet pressed against the skin to detect heat flux from the skin, the cup providing emissivity compensation and the film stopping evaporation from the skin.

2. A method as claimed in claim 1 wherein the plastic sheet is a bag which fully covers the infrared detector.

3. A method as claimed in claim 2 wherein the sheet and cup are positioned in the person's axilla.

4. A method as claimed in claim 1 wherein the sheet and cup are positioned in the person's axilla.

5. A method as claimed in claim 1 wherein the plastic sheet is infrared transparent.

6. A method as claimed in claim 1 wherein the cup is reflective.

* * * * *